United States Patent
Pg et al.

(10) Patent No.: US 8,593,296 B2
(45) Date of Patent: Nov. 26, 2013

(54) SYSTEM AND METHOD FOR TURBINE BUCKET TIP SHROUD DEFLECTION MEASUREMENT

(75) Inventors: KrishnaKumar Pg, Karnataka (IN); Daniel Howard Tragesser, Greenville, SC (US); Saurav Dugar, Karnataka (IN); Joseph Vincent Pawlowski, Phoenix, AZ (US)

(73) Assignee: General Electric Company, Schenectady, NY (US)

( * ) Notice: Subject to any disclaimer, the term of this patent is extended or adjusted under 35 U.S.C. 154(b) by 510 days.

(21) Appl. No.: 12/907,548

(22) Filed: Oct. 19, 2010

(65) Prior Publication Data
US 2012/0092179 A1    Apr. 19, 2012

(51) Int. Cl.
*G08B 21/00*    (2006.01)

(52) U.S. Cl.
USPC ..... 340/679; 340/680; 340/686.1; 340/686.4; 340/686.6

(58) Field of Classification Search
None
See application file for complete search history.

(56) References Cited

U.S. PATENT DOCUMENTS

| | | | |
|---|---|---|---|
| 4,049,349 A | 9/1977 | Wennerstrom | |
| 4,063,167 A | 12/1977 | Duly | |
| 4,395,827 A | 8/1983 | Stowe et al. | |
| 4,644,270 A * | 2/1987 | Oates et al. | 324/207.25 |
| 4,662,820 A * | 5/1987 | Sasada et al. | 415/173.6 |
| 4,842,477 A * | 6/1989 | Stowell | 415/118 |
| 5,017,796 A | 5/1991 | Makita | |
| 5,263,816 A * | 11/1993 | Weimer et al. | 415/131 |
| 6,568,254 B2 | 5/2003 | Pross | |
| 6,717,418 B2 * | 4/2004 | Orenstein | 324/644 |
| 7,215,129 B1 * | 5/2007 | Andarawis et al. | 324/662 |
| 7,333,913 B2 * | 2/2008 | Andarawis et al. | 702/158 |
| 8,015,722 B1 * | 9/2011 | Wilson | 33/542 |
| 2003/0011397 A1 * | 1/2003 | Briendl et al. | 324/772 |
| 2009/0064522 A1 * | 3/2009 | Herron et al. | 33/655 |
| 2009/0142194 A1 * | 6/2009 | Draper et al. | 416/190 |
| 2010/0054911 A1 * | 3/2010 | Wilson et al. | 415/47 |
| 2010/0054912 A1 * | 3/2010 | Wilson et al. | 415/47 |
| 2010/0218506 A1 * | 9/2010 | Nigmatulin et al. | 60/772 |
| 2010/0242293 A1 * | 9/2010 | Willett et al. | 33/501 |
| 2010/0296911 A1 * | 11/2010 | McCallum | 415/1 |
| 2010/0296912 A1 * | 11/2010 | McCallum et al. | 415/1 |
| 2013/0111982 A1 * | 5/2013 | Batzinger et al. | 73/112.01 |

* cited by examiner

*Primary Examiner* — Julie Lieu
(74) *Attorney, Agent, or Firm* — Nixon & Vanderhye P.C.

(57) ABSTRACT

A measurement system measures a gap between a plurality of rotating bucket tips and a stationary shroud surface. The system includes a sensor secured to the shroud surface, where the sensor senses a distance between each of the rotating bucket tips and the shroud surface, and a key phasor indexing each of the plurality of rotating bucket tips. A processor receives data from the sensor and the key phasor and calculates a shift against each of the plurality of buckets. The processor determines a time to bucket replacement based on current service hours of the plurality of rotating buckets tips.

15 Claims, 2 Drawing Sheets

FIG 1: Process Flow Diagram
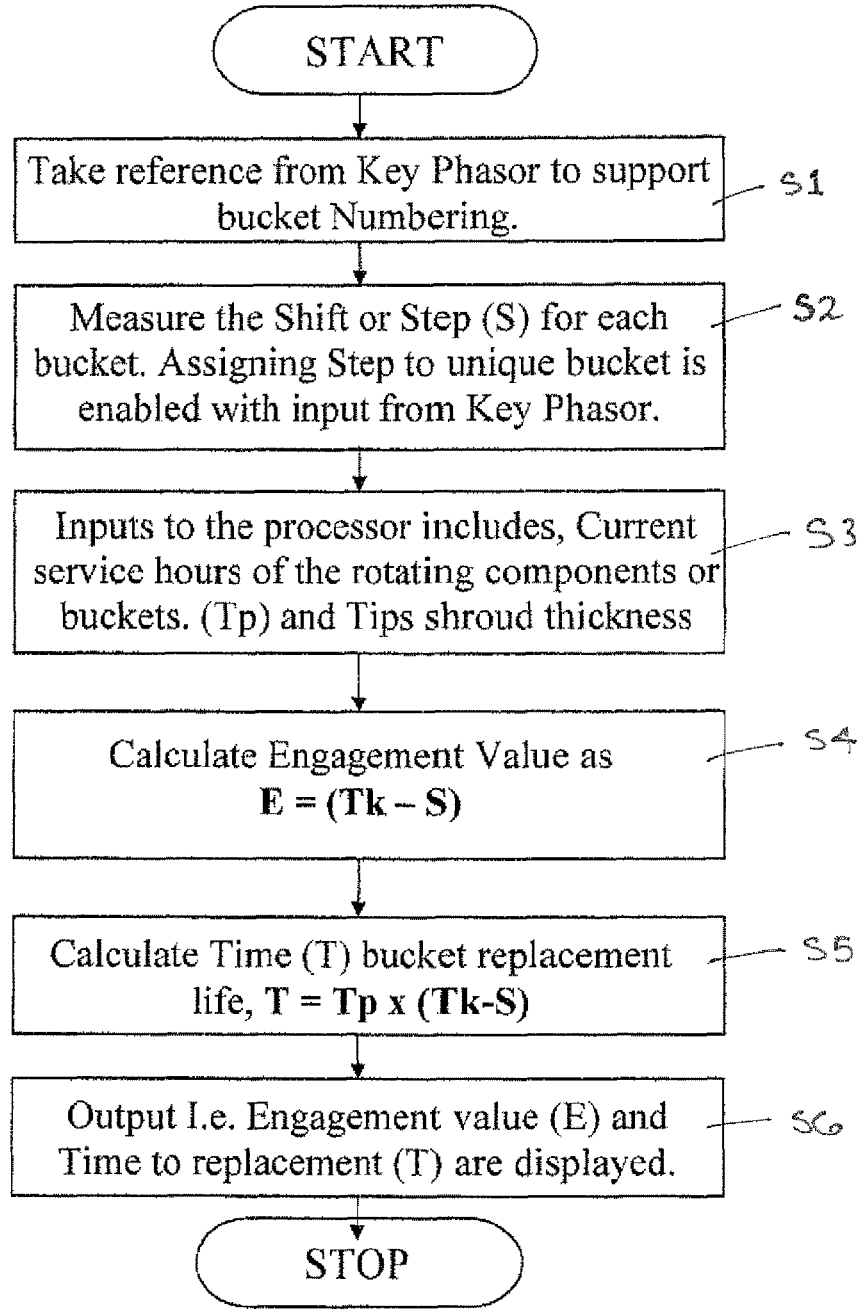

FIGURE 2: Arrangement drawing specifying the terms used.
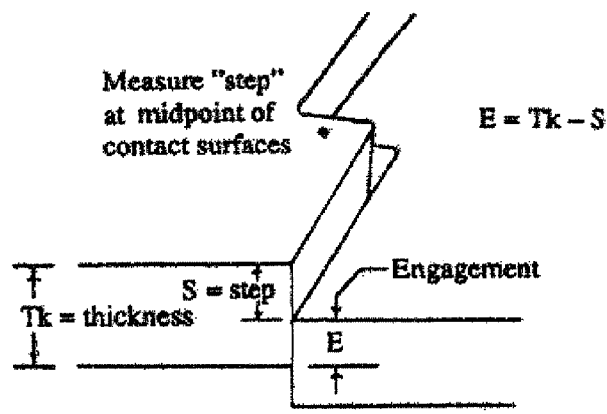
FIGURE 3: Arrangement Drawing
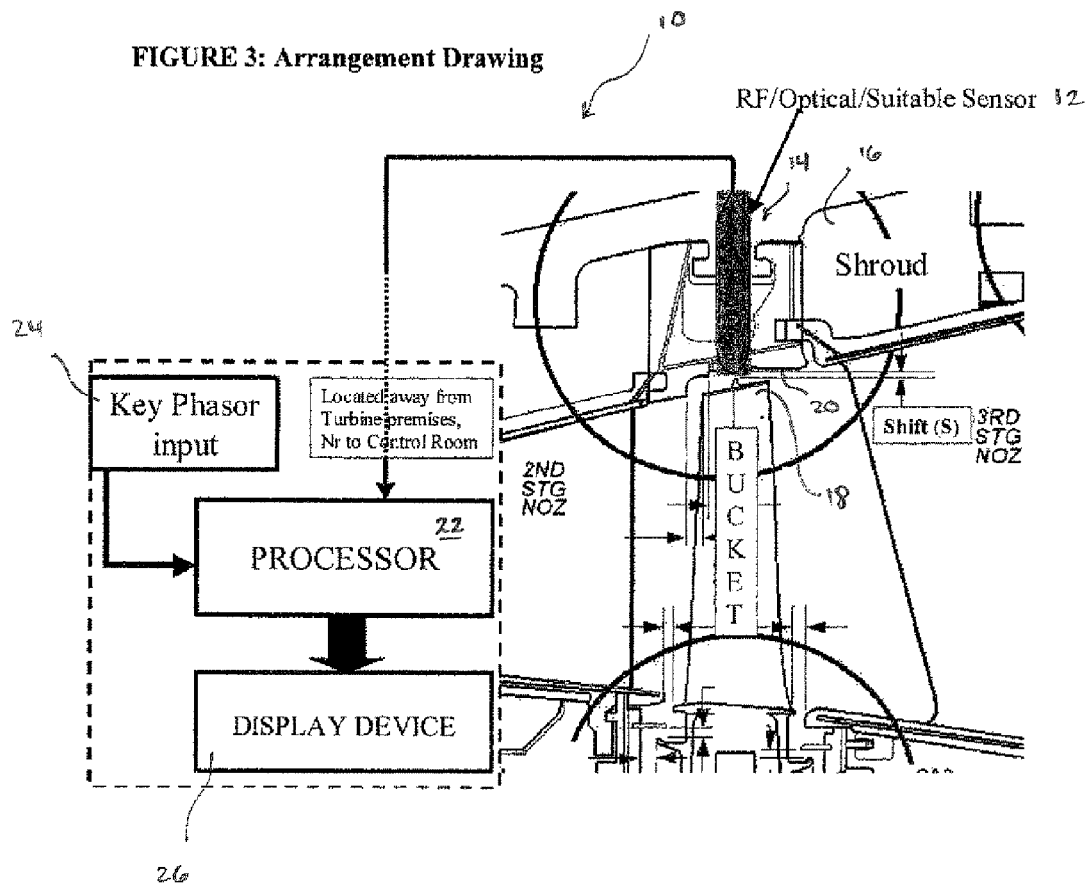

SYSTEM AND METHOD FOR TURBINE BUCKET TIP SHROUD DEFLECTION MEASUREMENT

BACKGROUND OF THE INVENTION

The invention relates to gas turbines and, more particularly, to a system and method for measuring turbine bucket creep deformation and determining a time to bucket replacement.

Certain gas turbines experience outward radial deformation due to creep in turbine blades. Turbine blades experience a high temperature environment and operating stresses that can result in tip shroud deflection. Outward radial creep deflection of the bucket tip shroud can lead to bucket tip shroud disengagement resulting in loss of aeromechanical vibration damping and possibly blade liberation.

The current methodology employed to calculate tip shroud radial creep requires unit shutdown and a process involving a borescope inspection. The borescope takes a step reading for all buckets on the wheel (in an exemplary turbine, there are 92 buckets on the stage 2 and stage 3 wheel). A problem with the current methodology is that the inspection requires unit shutdown, which can result in substantial cost and lost power generation.

It would be desirable for a system to calculate bucket life due to radial creep without requiring unit shutdown.

BRIEF DESCRIPTION OF THE INVENTION

In an exemplary embodiment, a method for measuring a gap between a plurality of rotating bucket tips and a stationary shroud surface includes the steps of (a) sensing a distance between each of the rotating bucket tips and the shroud surface; (b) indexing each of the plurality of rotating bucket tips with a key phasor; (c) calculating a shift against each of the plurality of buckets; (d) determining a time to bucket replacement based on current service hours of the plurality of rotating buckets tips.

In another exemplary embodiment, a measurement system measures a gap between a plurality of rotating bucket tips and a stationary shroud surface during operation of a turbine. The system includes a sensor secured to the shroud surface, where the sensor senses a distance between each of the rotating bucket tips and the shroud surface, and a key phasor indexing each of the plurality of rotating bucket tips. A processor receives data from the sensor and the key phasor and calculates a shift against each of the plurality of buckets. The processor determines an engagement value based on a tip shroud thickness and the shift, and the processor determines a time to bucket replacement based on current service hours of the plurality of rotating buckets tips and the engagement value.

In yet another exemplary embodiment, a method includes the steps of (a) sensing a distance between each of the rotating bucket tips and the shroud surface; (b) indexing each of the plurality of rotating bucket tips with a key phasor; (c) calculating a shift (S) against each of the plurality of buckets; (d) determining an engagement value (E) based on a tip shroud thickness (Tk) and the shift according to $E=Tk-S$; and (e) determining a time to bucket replacement (T) based on current service hours (Tp) of the plurality of rotating bucket tips and the engagement value according to $T=Tp*E$.

BRIEF DESCRIPTION OF THE DRAWINGS

FIG. 1 is a flow diagram of the process performed by the measurement system;

FIG. 2 shows a bucket tip subjected to creep and the data notations for calculating an engagement value; and FIG. 3 is a schematic drawing showing the measurement system.

DETAILED DESCRIPTION OF THE INVENTION

The method and system of the described embodiments determine the gap between rotating bucket tips in a turbine rotor wheel and a stationary shroud surface using a suitable sensor. Exemplary sensors include RF sensors, optical sensors or laser sensors, and those of ordinary skill in the art will contemplate other suitable sensors. Optical sensors can be modified with enhanced lens cooling technology to resist or minimize damage to the lens.

With reference to FIG. 3, the system 10 includes a sensor 12 secured in an opening 14 of a shroud 16. The shroud 16 can be designed to avoid damages due to dirt, oil or other undesired deposits. Preferably, the sensor 14 is secured at one of a top dead center or a bottom dead center of the turbine. The shroud block is suitably modified to ensure that the sensor 12 is positionable such that it can measure the gap between the rotating bucket tips 18 and a facing surface 20 of the shroud 16.

The sensor 12 communicates with a processor 22 that performs calculations to determine a time to bucket replacement. A key phasor 24 indexes each of the plurality of rotating bucket tips 18, and the processor calculates a shift against each of the plurality of buckets 18 with input from the sensor 12 and the key phasor 24. Measurements can be performed on a bucket-to-bucket relative basis or on a time based, blade specific, deflection basis. The processor 22 also communicates with a display device 26 for displaying the time to bucket replacement.

With reference to FIGS. 1 and 2, operations performed by the processor 22 will be described. In step S1, the key phasor 24 inputs data to the processor to support bucket numbering. Correspondingly, in step S2, the processor measures the shift or step (S) for each bucket with input from the sensor 12. The clearance value between bucket 18 and facing surface 20 of the shroud 16 can be taken to interpret the shift (S). The system leverages key phasor 24 to support bucket indexing and assign the shift (S) to the corresponding bucket.

In an exemplary embodiment, the processor 22 determines an engagement value (E) based on a tip shroud thickness (Tk) and the shift (S). The processor 22 shall have the provision to accept tip shroud thickness (Tk) as an input or store the tip shroud thickness values (Tk) in its memory. Additional input to the processor includes current service hours of the buckets (Tp). The engagement value is determined as: $E=Tk-S$ (steps S3 and S4).

The time to bucket replacement (T) is determined based on current service hours (Tp) of the plurality of rotating bucket tips and the engagement value (E) according to: $T=Tp*E$ (step S5).

The calculated time to bucket replacement (T) and possibly also the engagement value are subsequently displayed on the display device 26 (step S6).

The described embodiments provide an online (i.e., in use) tip shroud deflection assessment, thereby overcoming the disadvantages of the existing calculation method that requires unit outage and a borescope inspection. The described apparatus can be accommodated in the gas turbine with few modifications to the casing and shroud. The system works on calculating the tip deflection in real time and provides an output with the estimated replacement life of the buckets. As a consequence, the system and method reduce chances of a forced outage to gas turbines, which as noted result in considerable cost and lost production.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for measuring a gap between a plurality of rotating bucket tips and a stationary shroud surface in a turbine, the method comprising:
    (a) sensing a distance between each of the rotating bucket tips and the shroud surface;
    (b) indexing each of the plurality of rotating bucket tips with a key phasor;
    (c) calculating a shift against each of the plurality of buckets;
    (d) determining a time to bucket replacement based on current service hours of the plurality of rotating bucket tips;
    e) determining an engagement value based on a tip shroud thickness and the shift;
    wherein step (d) is practiced based on both the current service hours of the plurality of rotating bucket tips and the engagement value determined in step (e).

2. A method according to claim 1, further comprising displaying the time to bucket replacement.

3. A method according to claim 1, wherein the engagement value is determined according to $E=Tk-S$, where E is the engagement value, Tk is the tip shroud thickness, and S is the shift.

4. A method according to claim 3, wherein step (d) is practiced according to $T=Tp*E$, where T is the time to bucket replacement and Tp is the current service hours of the plurality of bucket tips.

5. A method according to claim 1, further comprising, prior to step (a), securing a sensor to the stationary shroud.

6. A method according to claim 5, wherein the securing step is practiced by securing the sensor at one of a top dead center and a bottom dead center of the turbine.

7. A method according to claim 1, wherein step (a) is practiced by sensing relative positions of the rotating bucket tips, wherein the shift corresponds to a step between the rotating bucket tips.

8. A method according to claim 1, wherein steps (a)-(d) are performed during operation of the turbine.

9. A method according to claim 1, further comprising activating an alarm when it is determined that bucket replacement is required.

10. A measurement system for measuring a gap between a plurality of rotating bucket tips and a stationary shroud surface during operation of a turbine, the system comprising:
    a sensor secured to the shroud surface, the sensor sensing a distance between each of the rotating bucket tips and the shroud surface;
    a key phasor indexing each of the plurality of rotating bucket tips; and
    a processor receiving data from the sensor and the key phasor, the processor calculating a shift against each of the plurality of buckets, wherein the processor determines an engagement value based on a tip shroud thickness and the shift, and wherein the processor determines a time to bucket replacement based on current service hours of the plurality of rotating buckets tips and the engagement value.

11. A measurement system according to claim 10, further comprising a display, the processor driving the display to display the time to bucket replacement.

12. A measurement system according to claim 10, wherein the sensor measures relative positions of the rotating bucket tips, the shift corresponding to a step between the rotating bucket tips.

13. A measurement system according to claim 10, wherein the sensor is secured in an opening in the shroud surface.

14. A measurement system according to claim 13, wherein the opening is formed in the shroud surface at one of a top dead center and a bottom dead center of the turbine.

15. A method for measuring a gap between a plurality of rotating bucket tips and a stationary shroud surface during operation of a turbine, the method comprising:
    (a) sensing a distance between each of the rotating bucket tips and the shroud surface;
    (b) indexing each of the plurality of rotating bucket tips with a key phasor;
    (c) calculating a shift (S) against each of the plurality of buckets;
    (d) determining an engagement value (E) based on a tip shroud thickness (Tk) and the shift according to $E=Tk-S$; and
    (e) determining a time to bucket replacement (T) based on current service hours (Tp) of the plurality of rotating bucket tips and the engagement value according to $T=Tp*E$.

* * * * *